United States Patent [19]

Colato

[11] 4,194,015
[45] Mar. 18, 1980

[54] METHOD OF COOKING A FROZEN FOOD ITEM WITH A HEAT PROBE

[75] Inventor: Albert E. Colato, St. Paul, Minn.

[73] Assignee: Plastics, Inc., St. Paul, Minn.

[21] Appl. No.: 919,745

[22] Filed: Jun. 26, 1978

[51] Int. Cl.$^2$ ............................................. A01K 43/00
[52] U.S. Cl. .................................. 426/233; 426/514; 426/523; 426/524
[58] Field of Search ............... 426/233, 243, 514, 523, 426/282, 524, 420, 88; 219/10.55 M, 10.55 A, 10.55 E; 99/DIG. 14; 85/20, 28, 10 R

[56] References Cited

U.S. PATENT DOCUMENTS

| | | |
|---|---|---|
| 1,919,692 | 7/1933 | Falkendorf ............................ 426/282 |
| 2,558,379 | 6/1951 | Phipard, Jr. ............................. 85/20 |
| 2,816,473 | 12/1957 | Labbee, Jr. ............................. 85/28 |
| 3,177,755 | 4/1965 | Kahn ..................................... 85/28 |
| 3,386,328 | 6/1968 | Litfin ..................................... 85/28 |
| 3,623,892 | 11/1971 | Koonz et al. ......................... 426/524 |
| 3,682,643 | 8/1972 | Foster ................................... 426/524 |
| 3,883,102 | 5/1975 | Trigg ..................................... 85/28 |
| 4,036,995 | 7/1977 | Koether et al. ....................... 426/523 |

FOREIGN PATENT DOCUMENTS

| | | |
|---|---|---|
| 719226 | 10/1965 | Canada .................................. 426/282 |
| 758598 | 10/1956 | United Kingdom .................. 426/523 |

Primary Examiner—S. Leon Bashore
Assistant Examiner—George C. Yeung
Attorney, Agent, or Firm—Wicks & Nemer

[57] ABSTRACT

A device for use in cooking a frozen food item with a heat probe which includes an insert rod member having a point on one end and a handle on the other end, the insert rod having threads thereon for aid in inserting and removing the insert. The method of cooking a frozen food item with the use of a heat probe consisting in inserting an insert rod into the food item in an unfrozen state, then freezing the food item with the insert rod therein, then removing the insert rod from the frozen food item thereby creating a hole in the frozen food item, then inserting a heat probe into the hole in the frozen food item, then cooking the food item with the heat probe therein.

1 Claim, 7 Drawing Figures

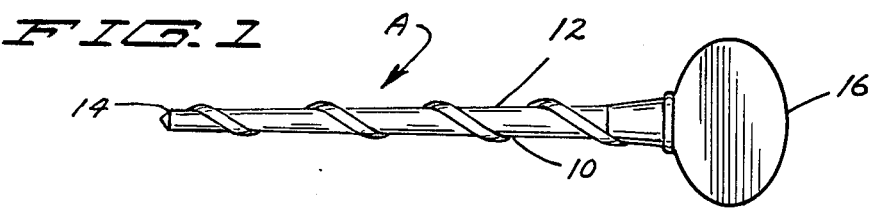
FIG. 1
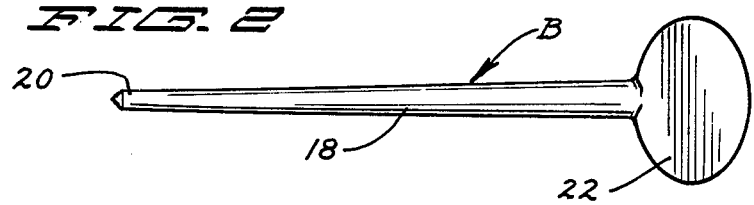
FIG. 2
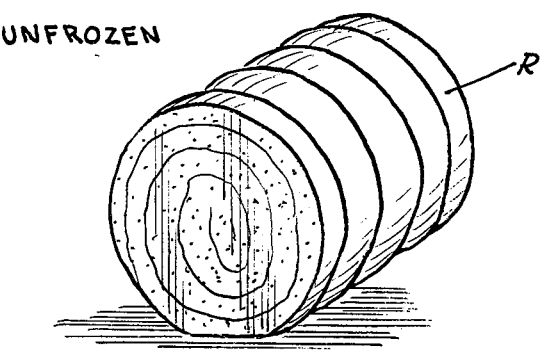
FIG. 3 UNFROZEN
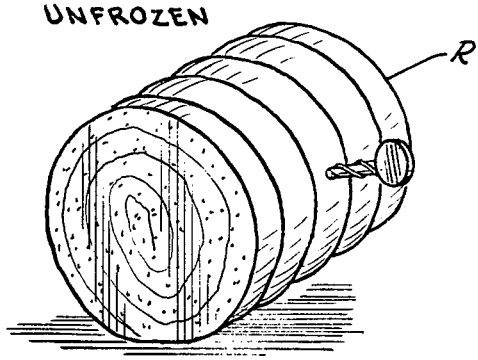
FIG. 4 UNFROZEN
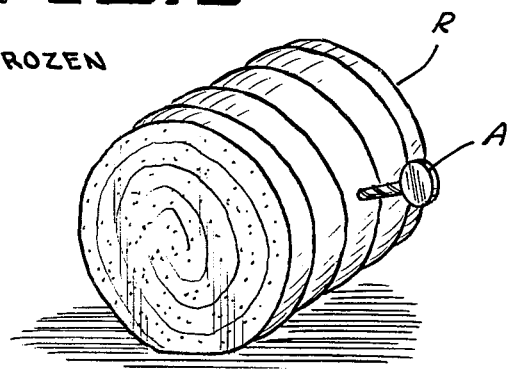
FIG. 5 FROZEN
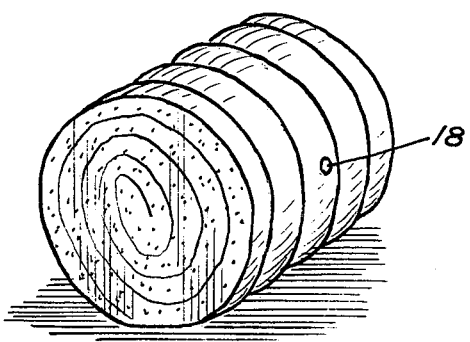
FIG. 6 FROZEN
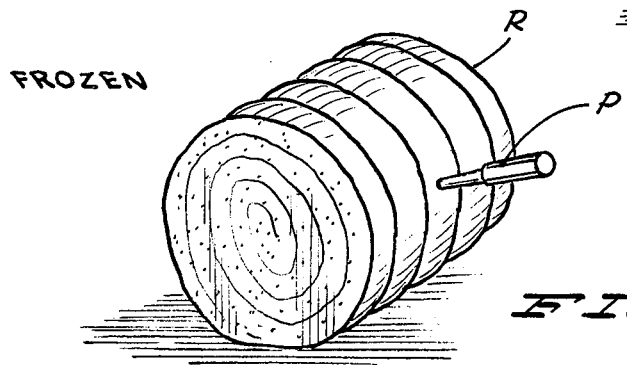
FIG. 7 FROZEN

METHOD OF COOKING A FROZEN FOOD ITEM WITH A HEAT PROBE

SUMMARY

The invention relates to an improvement in the cooking of a frozen food item with the aid of a conventional probe which is inserted into the frozen item for use during the controlled cooking of the item.

With the advent of microwave ovens, the use of frozen foods increased dramatically due to the fact that with the microwave oven there is quick defrosting of frozen food.

In the cooking of foods in both conventional and microwave ovens, a probe can be used which is inserted into the food to program the cooking by temperature. However, if frozen food is used insertion of the probe is impossible for the probe will not penetrate the frozen mass.

It is an object of the invention to provide a device and method for the preparation of a frozen food item for use with a conventional heat probe. The device includes a rod-like insert that has thread formations thereon. At one end of the insert is a handle and the other end is pointed to aid in insertion of the insert into the food item.

The insert is screwed into the food item when it is in an unfrozen state and prior to being frozen. The food item is then frozen. Prior to cooking the frozen item, the insert is unscrewed from the frozen item which leaves a hole formed in the frozen item. A probe is then inserted into the formed hole whereby the food item may be cycled to defrost and cook in a microwave oven without attendance throughout the integrated defrost and cook cycles. Without the subject device and method defrosting would have to take place and then an insert inserted to make a hole to receive the heat probe and the heat probe inserted for subsequent cooking.

The invention will appear more clearly from the following detailed description when taken in connection with the accompanying drawings, showing by way of example a preferred embodiments of the inventive idea wherein like numerals refer to like parts throughout.

In the drawings forming part of this application:

FIG. 1 is a side elevational view of a food insert embodying the invention.

FIG. 2 is an alternative form of a food insert.

FIG. 3 is a perspective view of a meat roast in an unfrozen condition.

FIG. 4 is a perspective view of the meat roast in an unfrozen state with the insert inserted into the same.

FIG. 5 is a perspective view of the meat roast in a frozen condition with the insert in the same.

FIG. 6 is a perspective view of the meat roast in frozen condition state with the insert removed and a hole existing in the frozen roast.

FIG. 7 is a perspective view of the meat roast in a frozen state with a conventional heat probe inserted into the roast for roasting control by the probe in an oven.

Referring to the drawings in detail, the insert A includes the rod-like body 10 which has formed on the surface thereof the threads 12. One end of the insert is pointed as at 14 to aid in insertion of the rod into the food item, and the other end has formed thereon the handle 16 for aid in inserting and removing the insert. A further embodiment of the insert B is shown in FIG. 2 which includes the rod-like body 18 which is pointed as at 20 and at the other end is formed the handle 22 for aid in inserting and removing the insert. The body 18 has a decreasing diameter substantially from the handle 22 to the point 20. The taper of the body 18 allows for release of the insert from the frozen food item when the insert is removed. The threads 12 of insert A allow for release of the rod from the frozen food item.

In using the device and method of the invention, the insert A is screwed into the meat roast R while it is in an unfrozen state as in FIG. 3. The roast is then frozen with the insert therein. When it is desired to defrost and cook the roast, the insert is unscrewed from the frozen roast which leaves a hole 18 extending into the frozen roast as in FIG. 5. With the hole 18 in the frozen roast, the end of the probe P may be easily and conveniently inserted into the hole and the frozen roast cooked with the use of the probe. The insert B is similarly used.

Having thus described the invention, what is claimed as new and desired to be secured by Letters Patent is:

1. The method of cooking a frozen food item with the use of a heat probe consisting in inserting an insert rod into the food item in an unfrozen state, then freezing the food item with the insert rod therein, then removing the insert rod from the frozen food item thereby creating a hole in the frozen food item, then inserting a heat probe into the hole in the frozen food item, then cooking the frozen food item with the heat probe therein.

* * * * *